Patented July 4, 1950

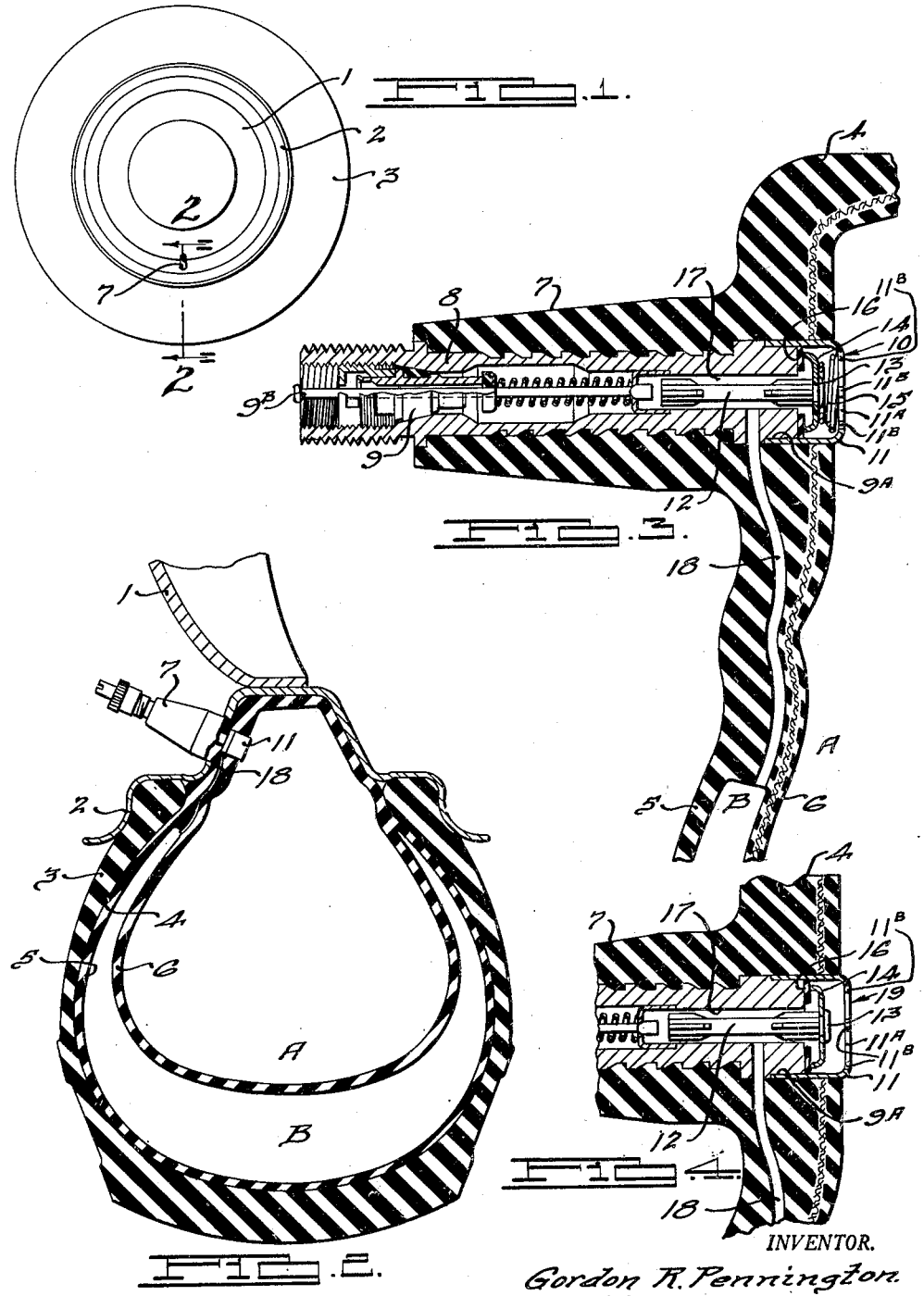

2,513,817

UNITED STATES PATENT OFFICE 2,513,817

VALVE CONSTRUCTION

Gordon R. Pennington, Bloomfield Hills, Mich., assignor to Chrysler Corporation, Highland Park, Mich., a corporation of Delaware Application February 14, 1944, Serial No. 522,238

3 Claims. (Cl. 152—429)

This application is a continuation-in-part of Pennington copending application Serial No. 476,283, filed February 18, 1943, now abandoned.

This invention relates to automobile tire construction and particularly to safety tubes of types which comprise two air chambers and a valve to control the flow of air in, out and between such chambers.

Commonly, valving is provided for tubes of the character referred to which includes a fixed orifice communicating with an inner pressure chamber which orifice is of sufficient size to permit the chamber to be inflated in reasonable time but which is, nevertheless, small enough to retain pressure in this inner chamber, in the event of a blowout and consequent loss of pressure in the outer air chamber, for a sufficient period of time to permit the car to be brought to a stop before the tire is completely collapsed. The selection of the proper size for this orifice presents a difficult problem. If it is made too small the time required for inflation or voluntary deflation becomes excessive. If, on the other hand, this orifice is made too large, the pressure in the inner tube will not be retained, in the event of a blowout, for a sufficient length of time to fully provide the safety feature desired.

The primary object of this invention is to provide valving which will automatically vary the effective orifice communicating with the inner air chamber of a safety tube of the character referred to in such a manner as to permit the rapid inflation and voluntary deflation of the tube but which will maintain the pressure in the inner air chamber for a substantial period of time when a blowout occurs.

Another object of the invention is to provide a tube with an inner and outer chamber constructed and arranged to be inflated to substantially equal pressures with means for equalizing such pressures during inflation or slow deflation.

Another object of the invention is to provide a dual valve which will permit the introduction of air into and out of the two chambers simultaneously.

A further object of the invention is to provide a valve actuated by centrifugal force which will maintain communication between the two chambers of such a tube to equalize the pressures between the latter so long as, but no longer than, the said pressures do not greatly differ.

Other objects and advantages of the invention will more fully appear from the following description taken in connection with the accompanying drawings, in which:

Fig. 1 is a side elevation of an automobile wheel having a tire and valve stem;

Fig. 2 is an enlarged sectional view through the tire taken on the line 2—2 of Fig. 1;

Fig. 3 is a further enlarged sectional view taken through the valve stem shown in elevation in Fig. 2;

Fig. 4 is a fragmentary view corresponding to Fig. 3 but showing a modification of my invention.

In the drawings 1 is a wheel having a rim 2 and a tire casing 3 in which is mounted a tube 4 comprising an outer rubber envelope 5 and an inner fabric and rubber wall 6 forming the inner and outer air chambers A and B.

A valve 7 comprises a valve body 8, a conventional tube valve which is referred to in its entirety by the numeral 9 and an automatic centrifugal valve assembly which will be referred to in its entirety as 10.

The valve assembly 10 comprises a cap 11 pressed onto the end portion 9a of the valve 8, a valve stem 12 fixed by a rivet 13 to a disc valve 14. A light spring 15 normally holds the valve 14 against a rubber washer 16 at the end of the valve body 8. The cap 11 has an open end 11a, providing communication between the chamber A and the valve 14. Inwardly projecting fingers 11b on the cap 11 retain the spring 15 against the valve 14.

A passage 17, which communicates with the outside atmosphere through the valve 9, communicates with the pressure chamber A through the valve 14 and with the pressure chamber B through a molded conduit or passage 18.

The operation of the device shown is as follows:

When the tire is to be inflated, air is introduced through the conventional valve 9 in the usual way and this air simultaneously flows into the chamber B through the conduit 18 and into the chamber A by lifting the valve 14 from its seat on the gasket 16 against the slight resistance of the light spring 15. When the tube is fully inflated the valve 14 will return to its seat against the washer 16 until the car is put into motion. As the car speed increases and the centrifugal force on the valve disc 14 increases this valve will tend to move against the resistance of the spring 15, and thereby place the chambers A and B into communication thus equalizing the air pressures between these chambers. As the direction of the centrifugal force is at an angle to the axis of the valve only part of this force will act against the spring, the balance acting against the wall of the passage 17 and thus producing against this wall a frictional resistance which will prevent vibration of the valve as a whole.

In the event of a blowout of the wall of the casing 3 and consequent rupture of the outer envelope 5 and sudden loss of pressure in the chamber B, the resulting pressure difference between chamber A and chamber B will cause the valve disc 14 to close against centrifugal force and thereby retain the air in pressure chamber A thus retaining sufficient air in the tire 3 to permit the car to be driven safely for a considerable distance. Thus my improved safety tube valving will not only provide increased safety by preventing complete deflation until the car can be brought to a stop but will also offer the added convenience to the driver of being able to drive to a service station or other convenient place for changing or repairing the damaged tube and tire.

When the tube is to be voluntarily deflated a valve stem 9b is depressed in the usual manner and thus will contact the valve stem 12 and thereby cause the valve disc 14 to be depressed thus opening communication into the pressure chamber A at the same time that communication is opened into pressure chamber B through the conduit 18.

It is desired to stress the fact that the spring 15 is light or weak so that it offers only slight resistance to movement of the valve 14 away from its seat on the washer 16. The valve 14 is of the type that may be lifted from its seat with a minimum of effort, for it has flat engagement with the washer 16 in a plane at right angles to the movement of the valve. The head of the valve will not tend to jam or to stick.

It is important that the valve 14 be opened with a minimum of effort and with no tendency to jam or stick, so that the centrifugal force imposed by normal operation at high or low speeds will always open the valve.

In some instances it may be desirable to eliminate altogether resistance to opening of the valve, and accordingly a valve assembly 19 has been provided, as shown in Fig. 4, in which no spring is present. The valve assembly 19 comprises a cap 11 open at 11a, a valve stem 12, and a disc valve 14, which closes by contacting a rubber washer 16. Under normal conditions there is nothing to hold the valve 14 closed. The cap 11 serves only to retain the valve 14 sufficiently to prevent dislodgement of the valve stem 12 from the passage 17, the fingers 11b on cap 11 limiting movement of the valve head 14. With equal pressure in chambers A and B the valve 14 is free and open. In the event of a slow leak in the outer envelope 5 the slight difference in pressure between the chambers A and B will not close the valve 14, and the pressures will be equalized by virtue of the communication between the chambers at the open valve 14. However, a blowout of the outer casing 5 and rupture of the outer envelope 3 will produce a large difference in pressure between the chambers A and B that will shut the valve 14, retaining sufficient pressure in the chamber A to permit the car to be driven safely for some distance.

The advantage in the valve assembly 19 of Fig. 4 is that there is communication between chambers A and B even when the tire is not rotating. Of course, the centrifugal force imposed by rotation of the tire positively assures opening of the valve 14 under normal conditions, and the large difference of pressure upon a blowout will close the valve against the centrifugal force.

The valve assembly 19 of Fig. 4 operates during inflation and deflation in the same manner as the valve assembly 10 of Fig. 3. Depression of the valve stem 9b positively displaces the valve 14 from its seat on the rubber washer 16, so that during inflation air will flow into the chamber A and during deflation air will flow out of the chamber A.

It will be understood that various changes including the size, shape and arrangement of parts may be made without departing from the spirit of my invention and it is not my intention to limit its scope other than by the terms of the appended claims.

I claim:

1. In a valve structure for a rotatable annular tube having an inner chamber and an outer chamber, comprising means forming a conduit entering the outer chamber, said means also forming a passage leading from a location exterior of both chambers to a place of merger with the conduit, an outer valve seated in said passage for inflating and deflating the tube, and passage forming means having an opening in the inner chamber and establishing communication therefrom to said place of merger, the aforesaid passage forming means being disposed along an axis lying oblique to the axis of rotation of the annular tube; the combination with the outer valve and the passage forming means, of means presenting a flat valve seat face surrounding the passage opening in the inner chamber, an open valve cap formed to receive valving for movement therein and being disposed adjacent said opening in association with said valve seat means, said valve cap having means including fingers arranged for a spacing from the valve seat means for retaining valving therein, centrifugal valving including a disc part received for movement in the valve cap generally along said oblique axis in response to centrifugal force in a direction toward said fingers, and otherwise sealingly tending to seat on said valve seat means normally and in response to existing pressure differential from the inner chamber through the passage forming means, and means connected with the outer valve and acting against the centrifugal valving to cause opening of the outer valve to effect positive opening of the disc part.

2. In a valve structure for a tube having an inner chamber and an outer chamber, comprising means forming a conduit leading from the outer chamber, said means also forming a passage leading from a junction between said passage and said conduit to the exterior of both chambers, said passage establishing communication with said conduit, an outer valve seated in said passage for inflating and deflating the tube, and passage forming means having an opening in the inner chamber and establishing communication therefrom to said junction; the combination with the aforesaid passage forming means and the outer valve, of valve seat forming means disposed in sealing adjacency to said passage opening in the inner chamber and having associated therewith a hollow valve cap provided with stop means in spacing relation thereto and formed to receive valving in said spacing, inner valving including a disc part received in said valve cap for movement influenced by wheel rotation from a position sealingly juxtaposed to said valve seat forming means toward said stop means and open position, and means connected with the outer valve for operative connection with the disc part for causing opening of the outer valve to effect positive opening of the inner valving.

3. In a valve structure for a rotatable annular tube having an inner chamber and an outer chamber, comprising means forming a conduit entering the outer chamber, said means also forming a passage leading from a location exterior of both chambers to a place of merger with the conduit, an outer valve seated in said passage for inflating and deflating the tube, and passage forming means having an opening in the inner chamber and establishing communication therefrom to said place of merger, the aforesaid passage forming means being disposed along an axis lying oblique to the axis of rotation of the annular tube; the combination with the outer valve and the passage forming means, of means presenting a flat valve seat face surrounding the passage opening in the inner chamber, an open valve cap formed to receive valving for movement therein and being disposed adjacent said opening in association with said valve seat means, said valve cap having means including fingers arranged for a spacing from the valve seat means for retaining valving therein and an interposed resilient member engaging the fingers, centrifugal valving including a disc part received for movement in the valve cap generally along said oblique axis in response to centrifugal force in a direction toward said fingers, and otherwise sealingly tending to seat on said valve seat means normally due to the urging of the interposed resilient member and in response to existing pressure differential from the inner chamber through the passage forming means, and means connected with the outer valve and acting against the centrifugal valving to cause opening of the outer valve to effect positive opening of the disc part.

GORDON R. PENNINGTON.

REFERENCES CITED

The following references are of record in the file of this patent:

UNITED STATES PATENTS

| Number | Name | Date |
| --- | --- | --- |
| 804,088 | Blakeslee | Nov. 7, 1905 |
| 2,122,740 | Eckeroth | July 5, 1938 |
| 2,207,212 | Arey | July 9, 1940 |
| 2,268,370 | Barkeij | Dec. 30, 1941 |